United States Patent

Kervagoret

[11] Patent Number: 4,672,885
[45] Date of Patent: Jun. 16, 1987

[54] SERVO DEVICE FOR CONTROLLING FLOW IN A HYDRAULIC INSTALLATION, PARTICULARLY FOR THE ASSISTED STEERING OF A VEHICLE

[75] Inventor: Gilbert Kervagoret, Argenteuil, France

[73] Assignee: Bendix France, Paris, France

[21] Appl. No.: 838,746

[22] Filed: Mar. 11, 1986

[30] Foreign Application Priority Data

Mar. 13, 1985 [FR] France ............................... 85 03688

[51] Int. Cl.⁴ ............................................. B62D 5/08
[52] U.S. Cl. ........................................ 91/450; 91/449; 91/458; 137/596.12; 180/142; 180/143
[58] Field of Search ...................... 137/596.12; 91/449, 91/450, 458; 180/141, 142, 143; 251/129.02, 129.14, 129.15

[56] References Cited

U.S. PATENT DOCUMENTS

| | | | |
|---|---|---|---|
| 3,744,515 | 7/1973 | Inoue | 91/458 X |
| 4,457,390 | 7/1984 | Abe et al. | 180/142 |
| 4,473,128 | 9/1984 | Nakayama et al. | 180/142 |
| 4,485,883 | 12/1984 | Duffy | 180/142 |
| 4,570,735 | 2/1986 | Duffy | 137/596.12 |
| 4,609,331 | 9/1986 | Duffy | 180/143 |

FOREIGN PATENT DOCUMENTS

| | | |
|---|---|---|
| 0071909 | 2/1983 | European Pat. Off. . |
| 0089512 | 9/1983 | European Pat. Off. . |
| 2207481 | 6/1974 | France . |
| 2275715 | 1/1976 | France . |

Primary Examiner—Allen M. Ostrager
Attorney, Agent, or Firm—Larry J. Palguta; Ken C. Decker

[57] ABSTRACT

The servo device for controlling flow (10) situated in a branch hydraulic line (6), incorporates in a body (11) an inlet passage (12) and an outlet passage (9) connected by an intermediate passage (13) forming a seat (14) for a valve component (15) which is pushed against its seat by a spring (26) and by an electromagnetic actuator (16) via a push-rod (23) which is slidingly sealingly mounted in a bore (22) between the intermediate passage (13) and an internal chamber (19) which is connected to the inlet passage (12).

6 Claims, 1 Drawing Figure

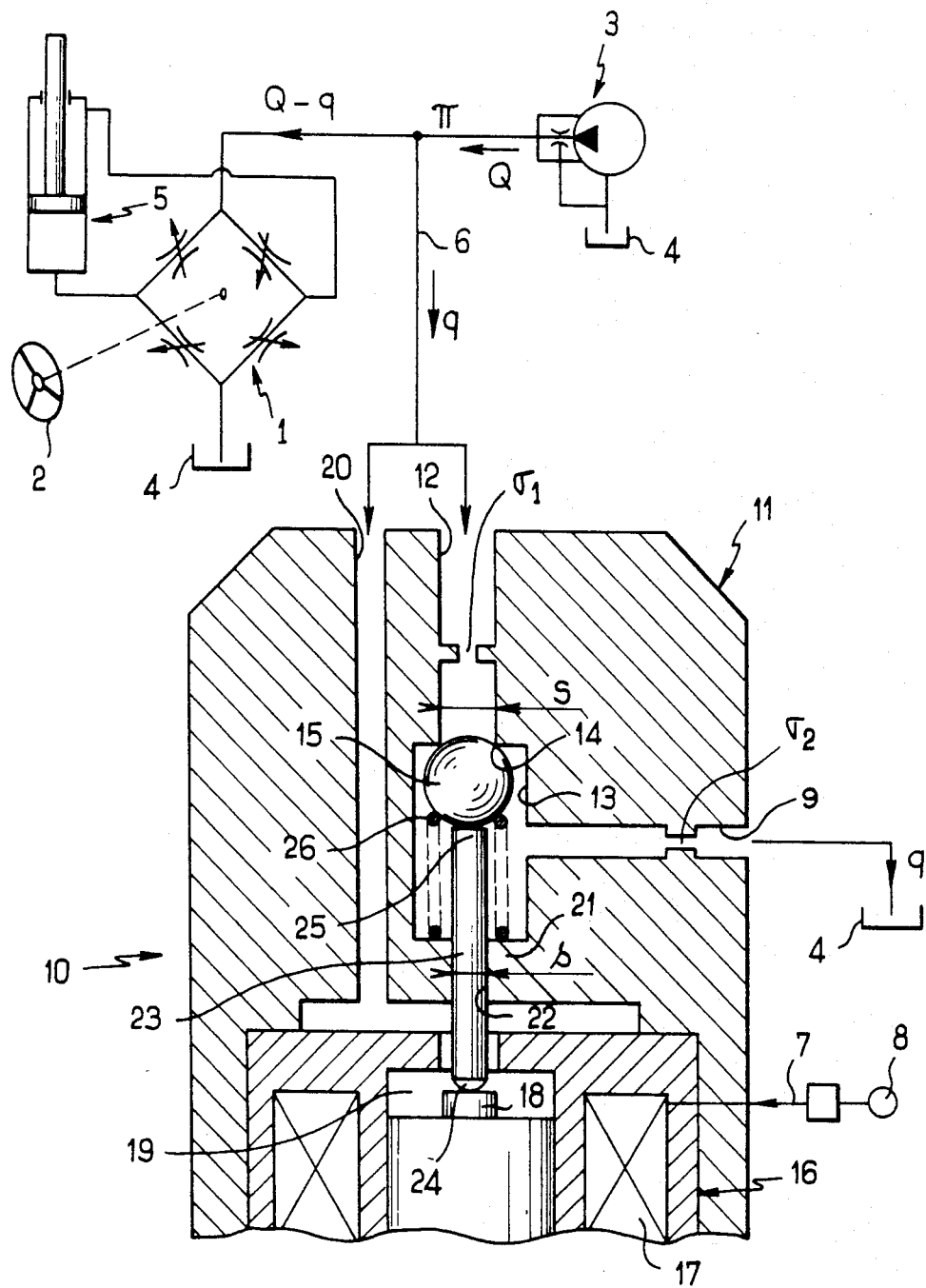

SERVO DEVICE FOR CONTROLLING FLOW IN A HYDRAULIC INSTALLATION, PARTICULARLY FOR THE ASSISTED STEERING OF A VEHICLE

The present invention concerns servo devices for controlling flow in a hydraulic installation, particularly for the assisted steering of a vehicle, comprising a source of pressure whose outlet is connected to a system for controlling a hydraulic actuator, the device being intended to be interposed in a branch hydraulic line between the outlet of the source of pressure and a reservoir, and being of the type comprising a body having an inlet passage which is intended to be connected to the outlet of the source of pressure, an outlet passage which is intended to be connected to the reservoir, and an intermediate passage between the inlet and outlet passages, in which a control component is situated which controls the flow of fluid between the inlet and outlet passages and which is regulated by an electromagnetic control means as a function of an electrical control signal, for example as a function of the speed of the vehicle for the assisted steering of the vehicle.

A device of this type is described in the document U.S. Pat. application No. -A-4,473,128. In this document, the flow of fluid bypassed in the branch line is determined by a restriction which is capable of being modulated and which is determined by a slide controlled by the electromagnetic control means, that is to say according to an arrangement depending on the position of the slide, this servo positioning being difficult to control, particularly as a function of the fluctuations of the electrical control signal of the electromagnetic control means, requiring the latter to provide permanently a relatively large force.

One object of the present invention is to propose a servo device for controlling flow of particularly simple design, which is robust and reliable, and is partially assisted by a hydraulic self-regulating arrangement.

To achieve this, according to a feature of the invention, the control component consists of a valve component cooperating with a valve seat which is formed in the intermediate passage between the inlet and outlet passages, the valve component being situated in this intermediate passage and being biased against its seat by a spring and by a first end of a push-rod which is mounted so as to slide and to be sealed in a bore of the body between the intermediate passage and a chamber which is in permanent communication with the inlet passage, the push-rod having its second end cooperating, in said chamber, with a plunger of the electromagnetic control means.

In such an arrangement, the flow of fluid bypassed in the branch line is thus controlled as a function of the equilibrium of the mechanical, electromagnetic and hydraulic forces acting on the valve component/push-rod assembly.

Other features and advantages of the present invention will appear from the following description of an embodiment, given by way of illustration but not limiting in any way, with reference to the accompanying drawings, in which:

-the single figure shows the outline diagram of an assisted steering system equipped with a servo device for controlling flow according to the invention, shown in diagrammatic section.

The diagram of the single figure shows an assisted steering system of a vehicle comprising, in a manner which is in itself known, a distribution servo-valve 1 which is actuated by the steering wheel 2 of a vehicle and which is interposed between a source of fluid under pressure 3, generally equipped with an integral flow regulation device, and a reservoir 4, so as to supply selectively and in turn the opposing chambers of a hydraulic assistance actuator 5 with fluid under pressure. In accordance with the invention, in a branch hydraulic line 6 between the outlet of the source of pressure 3 and the reservoir 4, a device 10 is interposed for controlling the flow bypassed in the branch line 6 (and thus subtracted from the steering servo-valve (1) as a function of an electrical signal 7 derived from a sensor 8 providing a characteristic parameter of the vehicle, for example the speed at which the latter is travelling.

The device 10 according to the invention incorporates a body 11 in which a fluid passage is formed consisting of an inlet passage 12 which is intended to be connected to the portion of the branch line 6 coming from the outlet of the source 3, an enlarged intermediate passage 13 and an outlet passage 9 which is intended to be connected to the reservoir 4. The junction between the inlet passage 12 and the intermediate passage 13 forms a seat 14 of transverse cross-section S for a valve component 15 consisting typically of a ball. An electromagnetic control component 16 is situated in the body 11, the electromagnetic control component 16 being of the electromagnet type with constant gap whose coil 17 receives the electrical control signal 7 mentioned above so as to control a plunger 18 which is capable of moving in a chamber 19 which is formed in the body 11 and which communicates permanently through a passage 20 in the body with the inlet of the inlet passage 12. The chamber 19 is separated from the intermediate passage by a bulkhead 21, forming the bottom of the intermediate passage 13 facing the valve seat 14. A bore 22 which is coaxial with the inlet passage 12 passes through the bulkhead 21, and mounted in the bore 22 so as to slide and to be sealed is a cylindrical push-rod 23 whose cross-section is less than the cross-section S and which has a first rounded end 24 which cooperates with the plunger 18 in the chamber 19, and whose second end 25 cooperates, in the intermediate passage 13, with the valve component 15 so as to push it towards its seat 14. The valve component 15 is also pushed permanently against its seat 14 by a spring which has a weak calibration 26. According to a feature of the invention, a fixed restriction $\sigma_1$ is formed in the inlet passage 12, a fixed restriction $\sigma_2$ being formed in the outlet passage 9.

The device operates as follows. Let Q and $\pi$ be the flow and the output pressure of the source of pressure 3, q be the flow bypassed in the branch line 6, $P_1$ be the pressure upstream of the valve seat 14 (downstream of the restriction $\sigma_1$), $P_2$ be the pressure in the intermediate passage 13, F be the force of the spring 26 and $\phi$ the force (capable of being modulated) applied by the plunger 18 onto the valve component 15 via the push-rod 23. It will be observed that the push-rod 23 is subjected permanently to the pressure differential $\pi$-$P_2$. When the valve component 15 is open, the branch line 6 passes a bypassed flow q such that:

$$q = \sigma_2 \sqrt{P_2} = \sigma_1 \sqrt{\pi - P_1} \tag{1}$$

The following relation then follows:

$$P_2 = (\pi - P_1) \cdot \left(\frac{\sigma_1}{\sigma_2}\right)^2 = (\pi - P_1) \cdot K \quad (2)$$

The opening condition of the valve component 15 is governed by the relation:

$$(P_1 - P_2)S = \phi + F + (\pi - P_2)\Delta \quad (3)$$

That is, $$P_1 = \frac{\phi + F + \pi[KS - (K-1)\Delta]}{(1+K)S - K\Delta} \quad (4)$$

From the relation (1) we derive the relation:

$$q = \sigma_1 \sqrt{\pi \frac{S - \Delta}{(1+K)S - K\Delta} - \frac{\phi + F}{(1+K)S - K\Delta}} = \sigma_1 \sqrt{A\pi - B} \quad (5)$$

It is thus shown that the value of the bypassed flow q is a function of the force $\phi$ (being added to the force F of the spring 26) provided by the electromagnetic control means 16, the other parameters being fixed parameters determined by construction. According to the relation:

$$\phi_M + F = \pi(S-\Delta) \quad (6)$$

where $\phi_M$ is the maximum force capable of being provided by the plunger 18.

Thus, for different values of the force $\phi$ (as a function of the electrical control signal 7) different values are obtained of the flow which is effectinely directed to the distribution servo-valve 1. Typically, the force $\phi$ is a function which is inversely proportional to the speed of the vehicle given by the sensor 8, from which there follows a reduction of the assistance provided by the hydraulic actuator 5 when the speed of the vehicle increases. However, at low speed, the force applied onto the valve component 15 is close to the maximum value $\phi_M$, the bypassed flow q then being practically nil.

Although the invention is described above in relation to a particular embodiment, the invention is not limited by this and on the contrary is capable of modifications and variants which will be apparent to those skilled in the art.

I claim:

1. A Servo device for controlling flow in a hydraulic installation (1,5), particularly for the assisted steering of a vehicle, comprising a source of pressure (3) whose outlet is connected to a system (1) for controlling a hydraulic actuator (5), the device (10) being intended to be interposed in a branch hydraulic line (6) between the outlet of the source of pressure (3) and a reservoir (4) and comprising a body (11) having an inlet passage (12) which is intended to be connected to the outlet of the source of pressure (3), an outlet passage 9 which is intended to be connected to the reservoir (4), and an intermediate passage (13) between the inlet and outlet passages in which a control component (15) is situated, the control component (15) controlling the flow of fluid between the inlet passage (12) and the outlet passage (14) and being regulated by an electromagnetic control means (16) as a function of an electrical control signal (7), characterized in that the control component (15) consists of a valve component cooperating with a valve seat (14) formed in the intermediate passage (13), the valve component (15) being situated in the intermediate passage (13) and being biased against a value seat (14) by a spring (26) and by a first end (25) of a push-rod (23) which is slidingly sealingly mounted in a bore (22) of the body connecting the intermediate passage (13) to an internal chamber (19) which communicates permanently with the inlet passage (12), the push-rod (23) having a second end (24) cooperating, in the chamber (19), with a plunger (18) of the electromagnetic control means (16).

2. Device according to claim 1, characterized in that the valve seat (14) has an opening whose cross-section (S) is greater than a transverse cross-section ($\Delta$) of the push-rod (23).

3. Device according to claim 1, characterized in that the inlet passage (12) includes a fixed restriction ($\sigma_1$).

4. Device according to claim 3, characterized in that the outlet passage 9 includes a fixed restriction ($\sigma_2$).

5. Device according to claim 2, characterized in that the valve seat (14) is formed by a junction between the inlet passage (12) and the intermediate passage (13).

6. Device according to claim 2, characterized in that the valve component (15) consists of a ball.

* * * * *